United States Patent Office

2,769,718
Patented Nov. 6, 1956

2,769,718

ZIRCONIA CEMENT

Neil N. Ault, Holden, Mass., assignor to Norton Company, Worcester, Mass., a corporation of Massachusetts No Drawing. Application October 12, 1954,
Serial No. 461,935

2 Claims. (Cl. 106—85)

The invention relates to cements and in accordance with the invention I have provided a chemical setting cement which hardens without the use of artificial heat in a short time. My cement is a zirconia base cement.

One object of the invention is to provide a highly refractory cement. Another object of the invention is to provide a cement which sets quickly. Another object of the invention is to provide refractory lined flame tubes for use as rocket nozzles or for the bodies of rockets. Another object of the invention is to produce the articles just mentioned at low cost.

Another object of the invention is to provide a cement which can be used to make abrasive articles without the use of heat, that is to say by simply mixing the abrasive with the cement, molding it into the desired shape, and allowing it to set at room temperatures. Another object of the invention is to make diamond abrasive articles such as the abrasive portion of diamond abrasive grinding wheels which act like vitrified bonded diamond abrasive wheels although made without the use of heat.

Other objects will be in part obvious or in part pointed out hereinafter.

For the manufacture of a refractory flame withstanding tube at low cost I can proceed as follows:

Taking an ordinary cardboard tube, meaning a tube made out of wood pulp, close it at one end with a stopper, then add a liquid slurry of stabilized zirconia according to U. S. Patent No. 2,535,526 to my colleagues Archibald H. Ballard and Douglas W. Marshall of Niagara Falls, Ontario, together with aluminum phosphate, $AlPO_4$, in the proportion of 95 parts by weight of the stabilized zirconia, $ZrO_2$, plus 5% CaO, and 5 parts by weight of the phosphate which is water soluble aluminum orthophosphate, $AlPO_4$, together with sufficient water to render the whole barely flowable, that is in the state known as a slurry to the ceramic engineer. The other end of the tube is now stoppered and the closed tube with contained slurry is rotated in order to distribute the slurry in a uniform layer all over the inside. Rotation is maintained until the cement has set which occurs at room temperatures within 25 minutes. This cement sets without artificial heat but of course in every chemical reaction the rate of reaction is a function of the temperature, so therefore my cement will harden more slowly at lower temperatures such as may be met with outdoors in wintertime outside of the tropics and naturally the colder it is the slower will the cement set.

The cement having set the tube is unstoppered and it is found that a hard uniform coating has been deposited on the inside thereof. This may be dried either at room temperatures or in an oven as desired depending upon the requirements of production. If the coating is not more than an eighth of an inch thick drying may be effected overnight at room temperature.

As the result of the foregoing procedure the article is completed and may be immediately used as a rocket tube. Since the ingredients of the rocket tube are not very expensive and the manufacturing procedure is simple low cost rocket tubes may be made in accordance with the invention. The cement is very refractory and will withstand temperatures up to 1800° C. or more. If the tube is heated to a high temperature for such a long time that the cardboard outside layer burns, the tube will nevertheless remain integral as the cement is far stronger than the cardboard. In fact the cardboard has become just so much extra weight and can be cut off if desired.

I have made tubes in this manner using cardboard tubes 48 inches long, 3 inches outside diameter, with a wall thickness of ¼ inch, with 15 pounds of cement mixture plus one pound of water for each tube, rotating the cardboard tube at 500 R. P. M. for 25 minutes the articles having been made in a factory room at a temperature of about 75° F. Drying was done over night in the same room at about the same temperature as this was convenient.

The aforesaid Letters Patent No. 2,535,526 describes the manufacture of fused zirconia to which calcium oxide as a stabilizing agent has been added in the amount of from 3% to 6% of the amount of $ZrO_2$ in the ore. This stabilized zirconium oxide is crystalline material crystallizing in the cubic system due to the presence of the lime, CaO. The lime, CaO, is in solid solution in the zirconium oxide mixture. I find that the presence of the lime in the zirconium oxide is vital for the manufacture of quick setting cement. I have tried ordinary or unstabilized zirconia which crystallizes in the monoclinic system and is therefore quite different from stabilized zirconia having lime therein, with the addition of aluminum phosphate. This exact combination is not described in U. S. Letters Patent No. 1,828,211 to August Wolfsholz of Milan, Italy, but the general suggestion to use aluminum phosphate with zirconium oxide is found therein, aluminum phosphate being a component of phosphoric acid in accordance with the patent but in accordance with that patent heating to a temperature of from 800° C. to 1000° C. is necessary or on the other hand, as stated in the patent, the plastic mass formed with the aid of phosphoric acid requires about a month's time for setting and drying and must be very carefully handled before burning as it crumbles easily. My cement has none of these defects and is "air setting" and also "water setting" which means that no artificial heat need be applied and it will set in air or under water as desired.

As changes in the proportions can be made I do not wish to be limited to the exact proportions above specified but can use from 90% to 99% by weight of stabilized zirconia having from 3% to 6% lime CaO, the remainder, except for the water, being aluminum phosphate which, however, need not be pure and it can have an excess of phosphoric acid so long as the pH is at least 3 numerically, that is to say the acidity is not greater than a pH of 3. Using 99% of the zirconia leaves only 1% for the aluminum phosphate but even with this low proportion of aluminum phosphate a cement according to the invention can be made. However in this case a large amount of water would be required so it is preferable to use greater proportions of the aluminum phosphate. I find that 5% aluminum phosphate and 95% of the zirconia described is a very good practical proportion and probably about the best proportion for the manufacture of rocket tubes. For abrasive articles I prefer a slightly greater proportion of aluminum phosphate, for example about 7% by weight.

But I may use up to 20% of unstabilized zirconia, $ZrO_2$, without any or with less than 3% of lime, CaO, as a diluent. Thus my cement before setting is from 90% to 99% zirconia of which at least 80% is stabilized zirconia containing from 3% to 6% by weight of lime, CaO, on the amount of $ZrO_2$ thereof, the remainder aluminum phosphate having a pH at least as high as 3 numerically.

There are certain advantages in diluting the stabilized zirconia with some unstabilized zirconia in certain applications. For example if, in a particular case, it is desired that the rate of setting shall be somewhat slower than the fastest obtainable using stabilized zirconia with the maximum amount, 6%, of lime, I can mix the stabilized zirconia with unstabilized zirconia and when the proportion of the latter reaches 20% and if the amount of lime in the stabilized zirconia is only 3%, I achieve the slowest rate of setting within the limits of this invention. If the grit size of the zirconia is very fine, say 100 grit size and finer, the rate of setting is so accelerated by the fineness of the grain that were all of the zirconia stabilized zirconia the cement would set too rapidly for some manufacturing operations, for example in making the wheels as described. The cement would have set in part before the material was properly distributed in the mold which would spoil the manufacturing operation. The tubes described were made out of zirconia of 24 grit size and finer. By finder, I mean that no attempt was made to select material of only that particular grit size but a range of sizes was selected to obtain maximum practical density. It is impossible to give more exact definition than this.

For the manufacture of grinding wheels especially diamond abrasive grinding wheels much finer grit size of material should be used in most cases. For example 100 grit size screened over 120 mesh screen to limit the sizes between these limits would be satisfactory for many diamond abrasive bodies and in this case I would want to use a substantial proportion of unstabilized zirconia to keep the rate of setting down so that the mold can be completely filled before any substantial proportion of the material has set.

How much water to use is wholly a matter of choice dependent upon the mode of application of the cement. Naturally if quick setting is desired the least amount possible of water will be used consistent with efficient spreading of the cement. The powder composition according to my invention consists of the ingredients as above defined without the presence of any water since the aluminum phosphate and the stabilized zirconia can be mixed in a dry state and will not react so long as kept reasonably dry. The reacted composition according to the invention is the reaction product of the ingredients; the chemistry is somewhat complicated and therefore I prefer to define the composition by the original ingredients.

By the expression "chemical setting cement" I mean a cement which sets without artificial heat. Such cements have been called cold setting cements but the new terminology is chemical setting. The incipient melting point of my reacted cement is above 1800° C.

For the manufacture of an abrasive article I simply mix comminuted abrasive material with the ingredients of the cement, mold the mixture to the desired shape and allow it to set at room temperature. This phase of the invention has its greatest utility in the manufacture of diamond abrasive portions. As it is well known almost all diamond abrasive wheels consist of a non-diamond bearing center or back to which is secured by molding, by subsequent attachment, by cementing or in other ways, a rim or a face tapered or straight of the diamond bearing abrasive portion. This is so because of the high cost of diamond and ordinarily diamond depth, meaning the thickness in the direction of feed of the grinding wheel of the diamond bearing portion is one-eighth inch or less whereas the wheel may be from a fraction of an inch to many inches in diameter. The technique, however, of uniting the abrasive portion with the center or back is now so well known that I do not have to describe same.

While the proportion of diamond abrasive by volume to the cement may be almost anything, usually diamond abrasive portions range from about 6% by volume to about 25% by volume. Grit sizes range usually from around 8 grit size to 220 grit size but any grit size as well as any proportion may be used in carrying out my invention. Therefore for the manufacture of diamond abrasive portions or bodies for diamond grinding wheels, hones, or sticks or the like I simply mix the desired proportion of comminuted diamond abrasive material with the ingredients of the cement as heretofore explained using sufficient water to render the mixture barely flowable. This barely flowable water bearing mixture of the stabilized zirconia with lime and the aluminum phosphat is, quickly after mixing, charged into the desired mold which should be an open mold so that the water can evaporate. If the mold is deep more than 25 minutes will be needed to cause the cement to set and in fact setting of a mixture in a stationary mold is a function of the dimensions so I cannot be exact as to the time involved. In some cases a good many hours would be needed. However anyone making a diamond abrasive or other abrasive object in accordance with this invention will readily know when the cement has set sufficiently and of course to be on the safe side a little surplus time should be given after the cement appears to have become hard. This cement bonded diamond abrasive has the grinding properties of vitrified bonded diamond abrasive.

It will thus be seen that there has been provided by this invention a refractory cement in accordance with which the various objects hereinabove set forth together with many thoroughly practical advantages are successfully achieved. As many possible embodiments may be made of the above invention and as many changes might be made in the embodiment above set forth, it is to be understood that all matter hereinbefore set forth is to be interpreted as illustrative and not in a limiting sense.

I claim:

1. A chemical setting cement mixture as yet unset essentially consisting of from 90% to 99% of zirconia of which at least 80% is stabilized zirconia containing from 3% to 6% by weight of lime, CaO, on the amount of $ZrO_2$ thereof, the remainder aluminum phosphate having a pH at least as high as 3 numerically.

2. The dried reaction product of the chemical cement of claim 1 mixed with water being a hardened refractory cement having an incipient melting point in excess of 1800° C.

References Cited in the file of this patent

UNITED STATES PATENTS

| 2,535,526 | Ballard et al. | Dec. 26, 1950 |

FOREIGN PATENTS

| 2,075 | Australia | 1931 |